(12) United States Patent
Shroff

(10) Patent No.: US 7,408,179 B2
(45) Date of Patent: Aug. 5, 2008

(54) TRANSITION RADIATION APPARATUS AND METHOD THEREFOR

(75) Inventor: Yashesh A. Shroff, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 10/915,809

(22) Filed: Aug. 10, 2004

(65) Prior Publication Data

US 2006/0032811 A1 Feb. 16, 2006

(51) Int. Cl.
*H05G 2/00* (2006.01)
(52) U.S. Cl. .................................. 250/504 R
(58) Field of Classification Search ............. 250/504 R; 210/490; 216/2; 315/500; 378/119
See application file for complete search history.

(56) References Cited

U.S. PATENT DOCUMENTS

| | | | | |
|---|---|---|---|---|
| 5,471,091 A | * | 11/1995 | Pasch et al. | 257/752 |
| 5,485,304 A | * | 1/1996 | Kaeriyama | 359/291 |
| 6,280,906 B1 | * | 8/2001 | Braat et al. | 430/296 |
| 6,903,354 B2 | * | 6/2005 | Goldstein | 250/492.3 |
| 2004/0183486 A1 | * | 9/2004 | Goldstein | 315/503 |
| 2005/0162727 A1 | * | 7/2005 | Ishii et al. | 359/245 |

FOREIGN PATENT DOCUMENTS

KR 2003071194 * 9/2003

OTHER PUBLICATIONS

Artru, et al. "Practical theory of the multilayered transition radiation detector," Phys. Rev. D. vol. 12, No. 5, Sep. 1, 1999.*

Piestrup, et al. "Measurements of x-ray emission from zinc and molybdenum transition radiators," J. Appl. Phys. vol. 73, No. 10, May 15, 1993.*

Artru et al., "Practical theory of the multilayered transition radiation detector", Physical Review D, vol. 12, No. 5, pp. 1289-1306, Sep. 1, 1975.

Cherry et al., "The Efficient Identification of Relativistic Particles by Transition Radiation", Nuclear Instruments and Methods, vol. 115, pp. 141-150, 1974.

Knulst et al., "Observation of narrow-band Si L-edge Cerenkov radiation generated by 5 MeV electrons", Applied Physics Letters, vol. 79, No. 18, pp. 2999-3001, Oct. 29, 2001.

(Continued)

*Primary Examiner*—Jack I. Berman
*Assistant Examiner*—Michael Maskell
(74) *Attorney, Agent, or Firm*—Blakely, Sokoloff, Taylor & Zafman LLP

(57) ABSTRACT

In one embodiment of the present invention, intervening material layers (208) are recessed (304) relative to membrane layers (208) thereby providing increased surface area contact between the membranes (208) and support posts (408). Increased surface area contact assists in reducing membrane shape changes (122) and defects (124, 126) that can result from thermal and physical stress.

In an alternative embodiment, problems related to stiction during release of a stack of membranes (208) is reduced by using different processes to completely remove portions of intervening material layers (206) between membrane layers (208). The first process removes the bulk of the intervening material layer (206). The second process removes the remaining portions of the intervening material layer (602).

11 Claims, 6 Drawing Sheets

OTHER PUBLICATIONS

Knulst et al., "High-brightness, narrowband and compact, soft x-ray Cherenkov sources in the water window", Applied Physics Letters, vol. 83, No. 19, pp. 4050-4052, Nov. 10, 2003.

Yuan et al., "Energy Dependence of X-Ray Transition Radiation from Ultrarelativistic Charged Particles", Physics Letters, vol. 31B, No. 9, pp. 603-605, Apr. 27, 1970.

* cited by examiner

TRANSITION RADIATION APPARATUS AND METHOD THEREFOR

RELATED APPLICATIONS

The present application is related to the subject matter of U.S. patent application Ser. No. 10/371,541 of Goldstein, entitled "Extreme Ultraviolet Transition Oscillator," and filed Feb. 21, 2003. U.S. patent application Ser. No. 10/371,541 is assigned to the assignee hereof.

FIELD OF THE INVENTION

Embodiments of the present invention relate generally to transition radiation. More specifically, embodiments of the present invention teach improved transition radiation emitting (TRE) structures and methods therefor.

BACKGROUND

Micro Electro Mechanical Systems (MEMS) processing is being investigated as an alternative for fabricating extreme ultraviolet (EUV) transition radiation laser (TRL) and transition radiation oscillator (TRO) structures. MEMS TRO fabrication can involve forming layers of membranes spaced apart by layers of intervening material or vacuum regions. The total number of membranes, membrane thickness, membrane spacing, and presence or absence of the intervening material can all affect the output wavelength of the TRO device. When fabricating TRO devices that operate at higher frequencies, for example in the extreme ultraviolet (EUV) region (around 13 nanometers), it may be necessary to remove intervening material between membrane layers to insure proper TRO device operation. Removal of intervening material can produce problems with TRO device operation if it damages the membranes or results in membrane shape changes.

Shown in FIG. 1A, is a cross section of a prior art EUV TRL (or TRO) structure 100. Under normal operation, relativistic particle energy 140 is directed through membranes 120 to produce EUV radiation 150 at the output of the structure 100. In this example, intervening material has been removed from between membranes 120 thereby forming vacuum regions 130. The structure 100 thus comprises alternating layers of membrane regions 120 and vacuum regions 130. The edge of membrane regions 120 are held in place by support posts 110. Here, even though membranes 120 are not supported or spaced apart by an intervening material layer, the membranes' surfaces 132 are of uniform shape and planer relative to each other. The distance 134 between membranes is relatively constant along the surface 132 of the membrane. In addition, this distance is also relatively constant from membrane-to-membrane. Under these conditions, the structure 100 operates normally to produce a coherent superposition of transition radiation at EUV wavelengths.

Shown in FIG. 1B, is a TRL (or TRO) structure similar to that shown in FIG. 1A. However, In FIG. 1B, some membranes 121, 123 have become defective or experienced shape changes. These membrane defects/shape changes can include membrane bowing 122, membrane breaking 126, and membrane support post separation/fracture 124. Membrane bowing 122 can be the result of thermally induced stress resulting from the high temperature operation of the TRL (or TRO) device. Membrane breaking 126 can result from mechanical or thermal stress induced into the membrane 125 during operation, handling, or fabrication of the structure. Membrane support post separation 124 can result when the membrane's intrinsic stress exceeds the fracture point of the interface between the support post 110 and the membrane 130. When this occurs, the membrane 123 can snap away from the support post 110, as shown in FIG. 1B.

The membrane shape changes can impact the structure's performance by producing aberrational output radiation 160. The effect of this aberrational output radiation 160 can be manifested in a variety of undesirable ways that include shifts in the output radiation's peak intensity or wavelength.

DRAWING DESCRIPTIONS

Figure 1A:
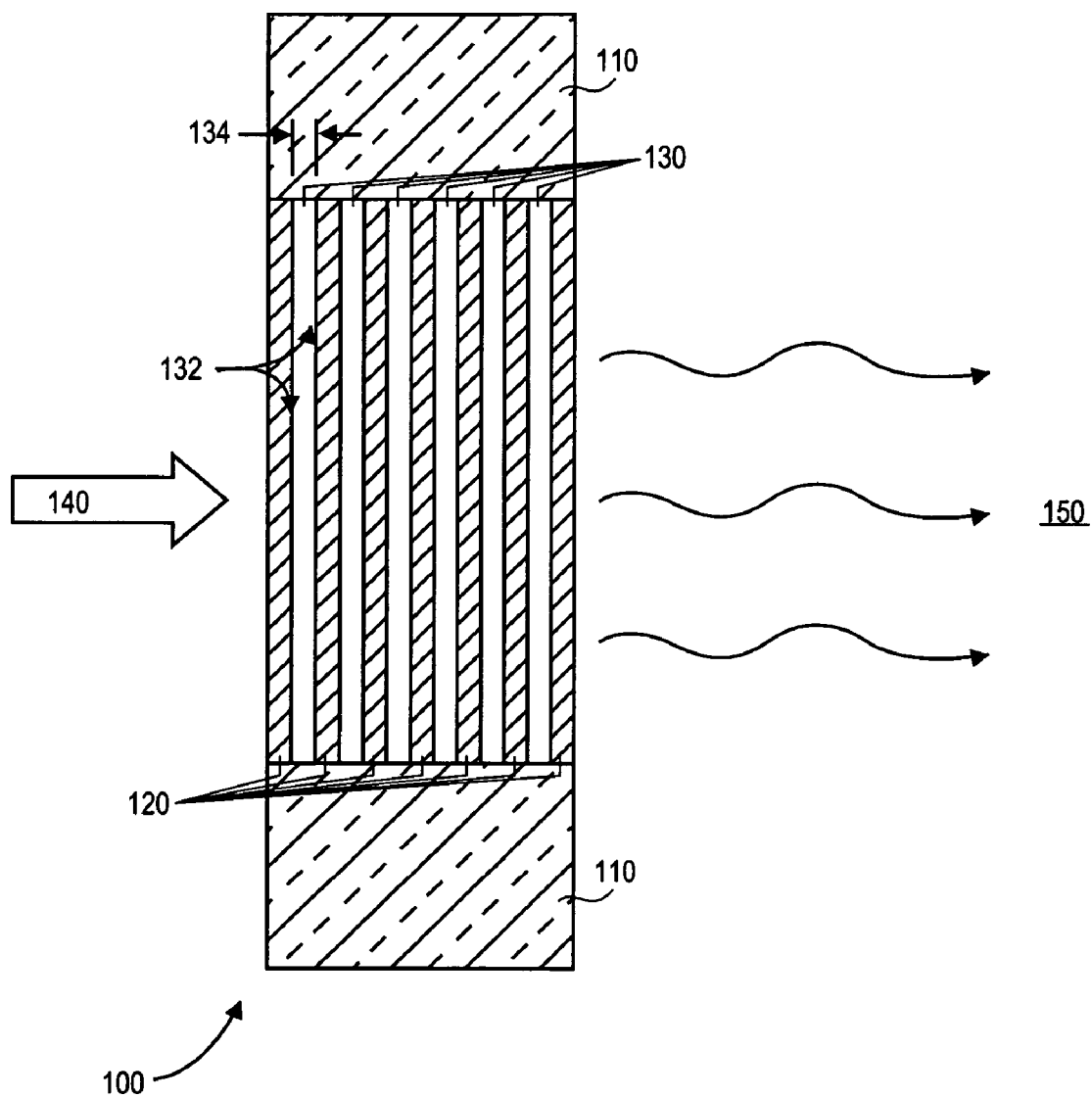
FIG. 1A illustrates an example of a prior art TRL structure under normal operation.
Figure 1B:
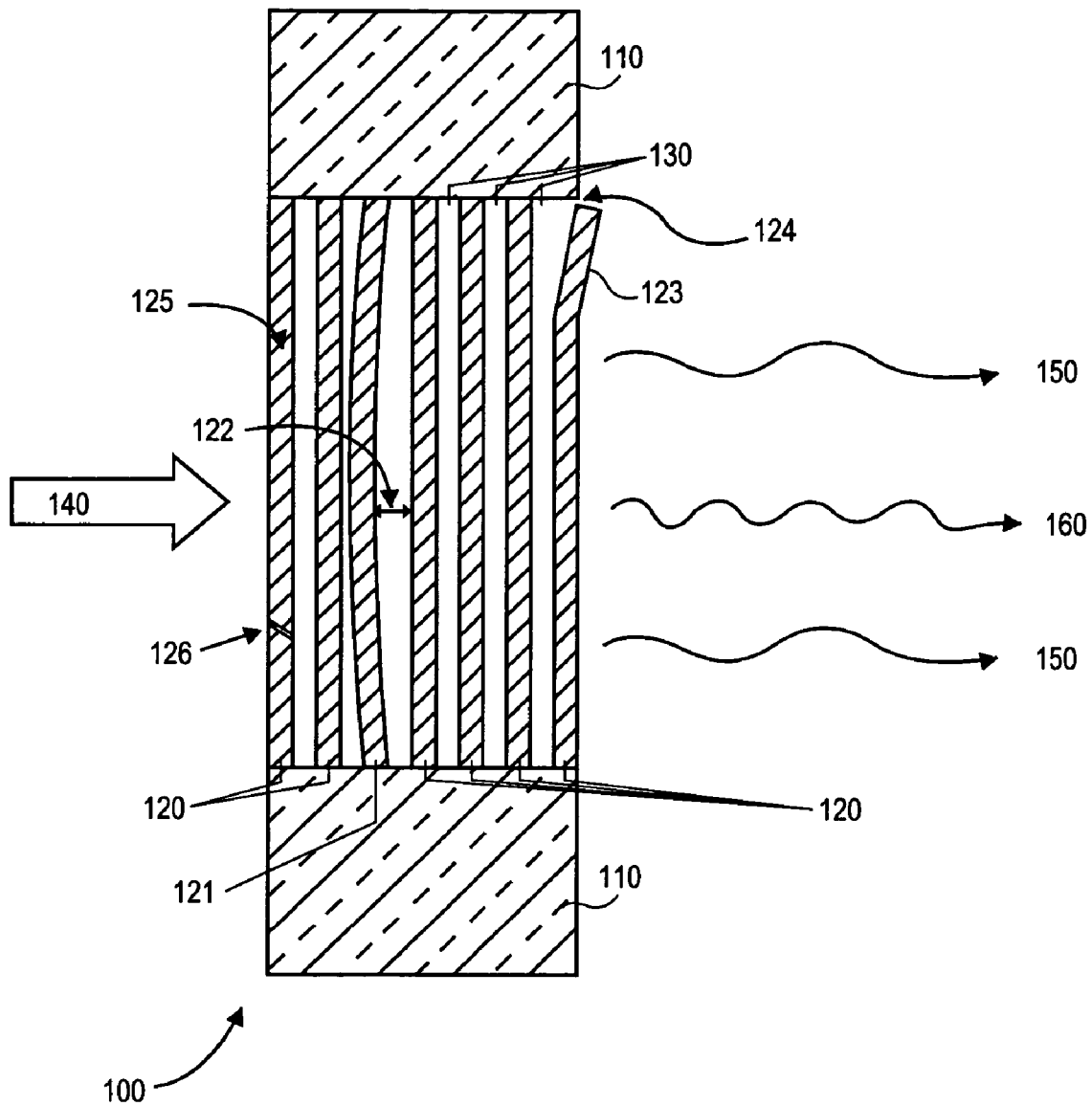
FIG. 1B illustrates an example of a prior art TRL structure having membrane defects that can affect TRL operation.
Figure 2:
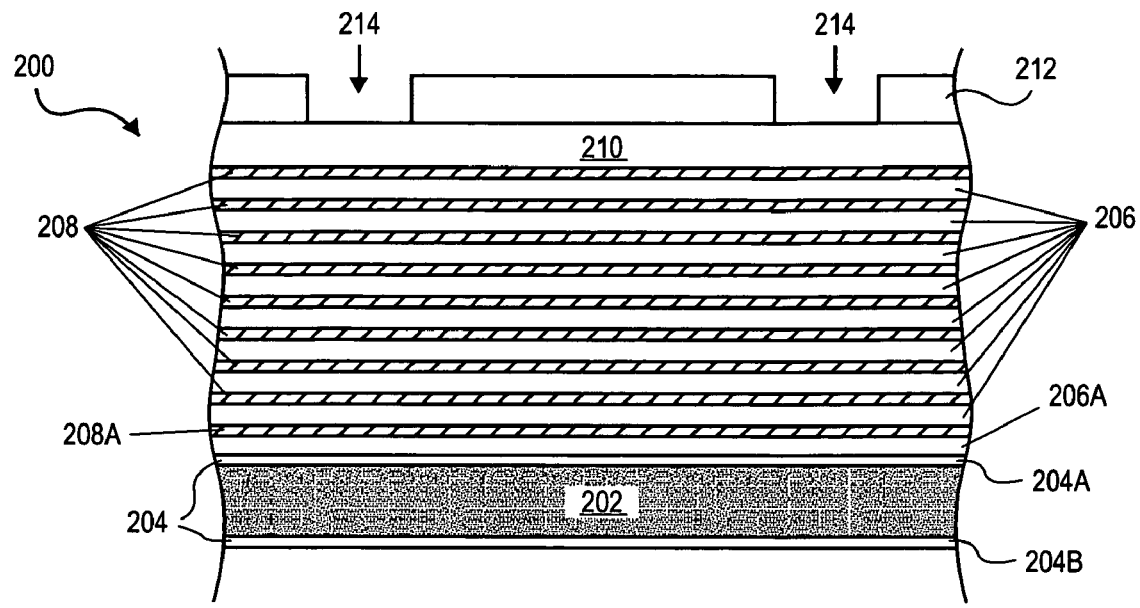
FIG. 2 illustrates an example of a transition radiation emitting structure prior to forming membrane support posts.
Figure 3:
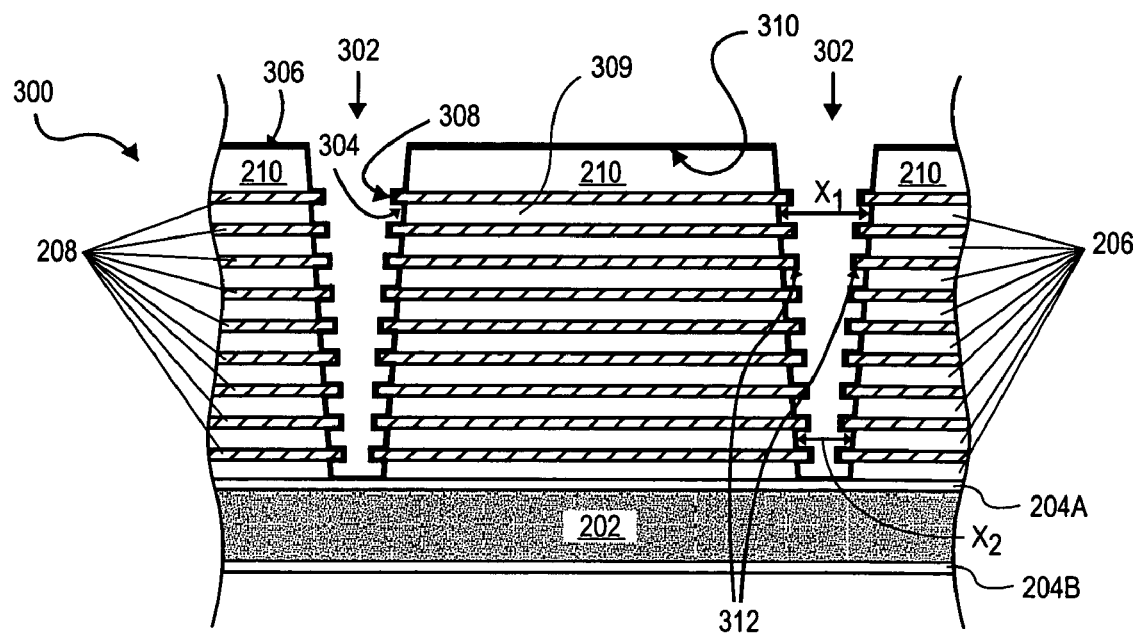
Figure 4:
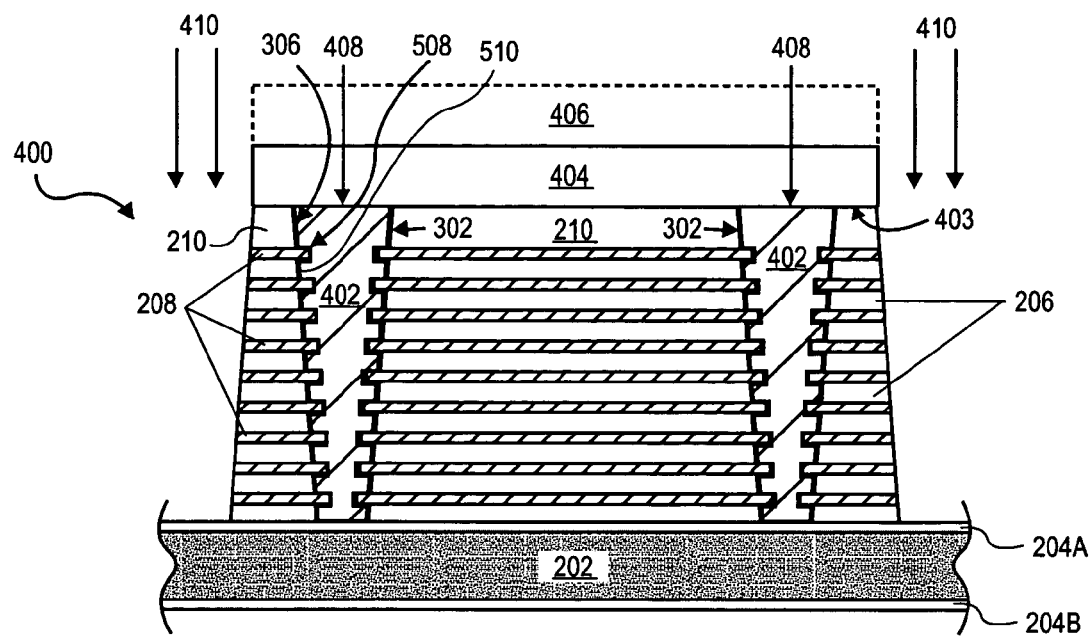
Figure 5:
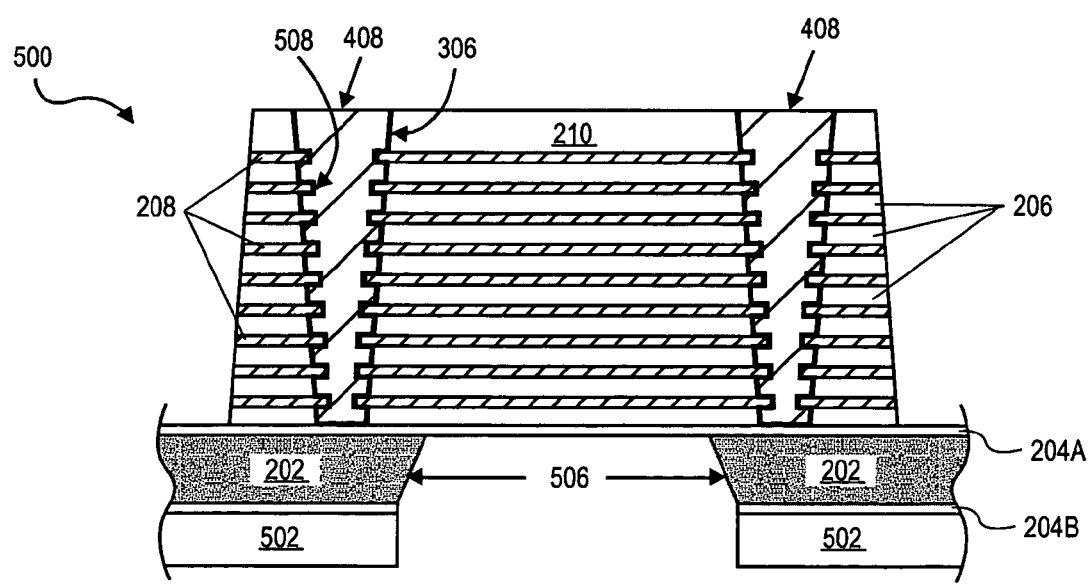
Figure 6:
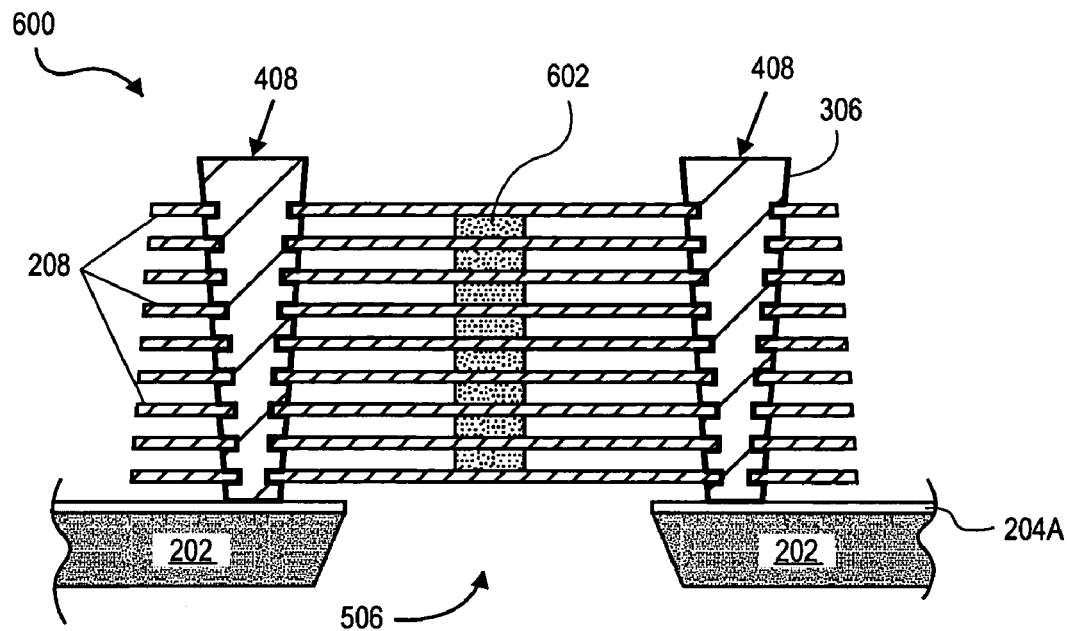
Figure 7:
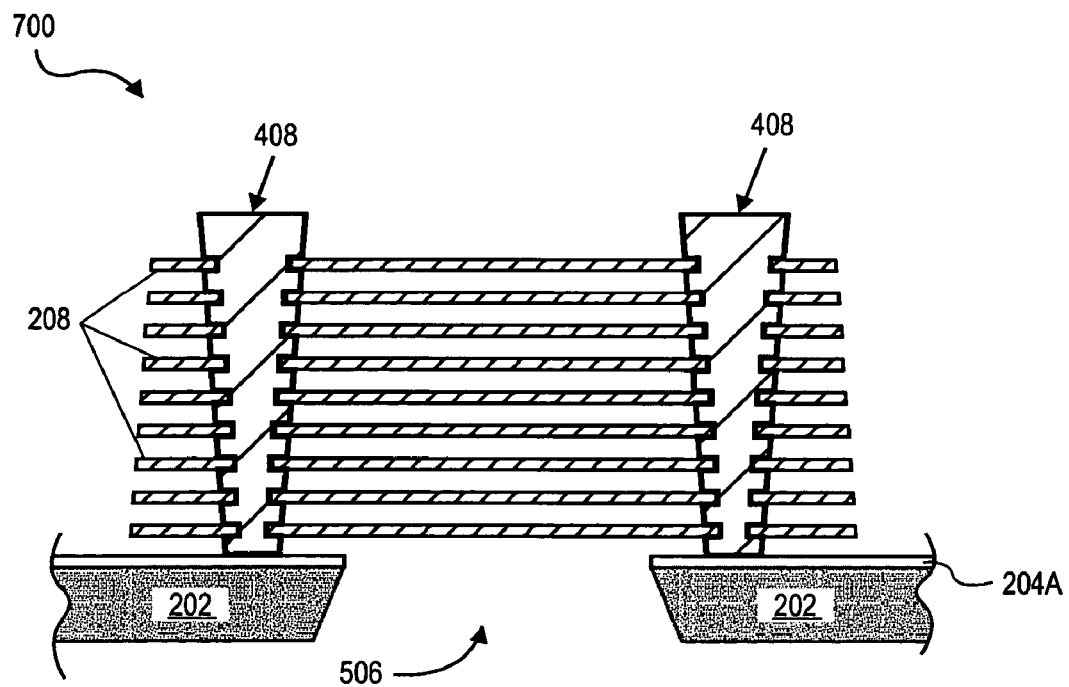
Figure 8:
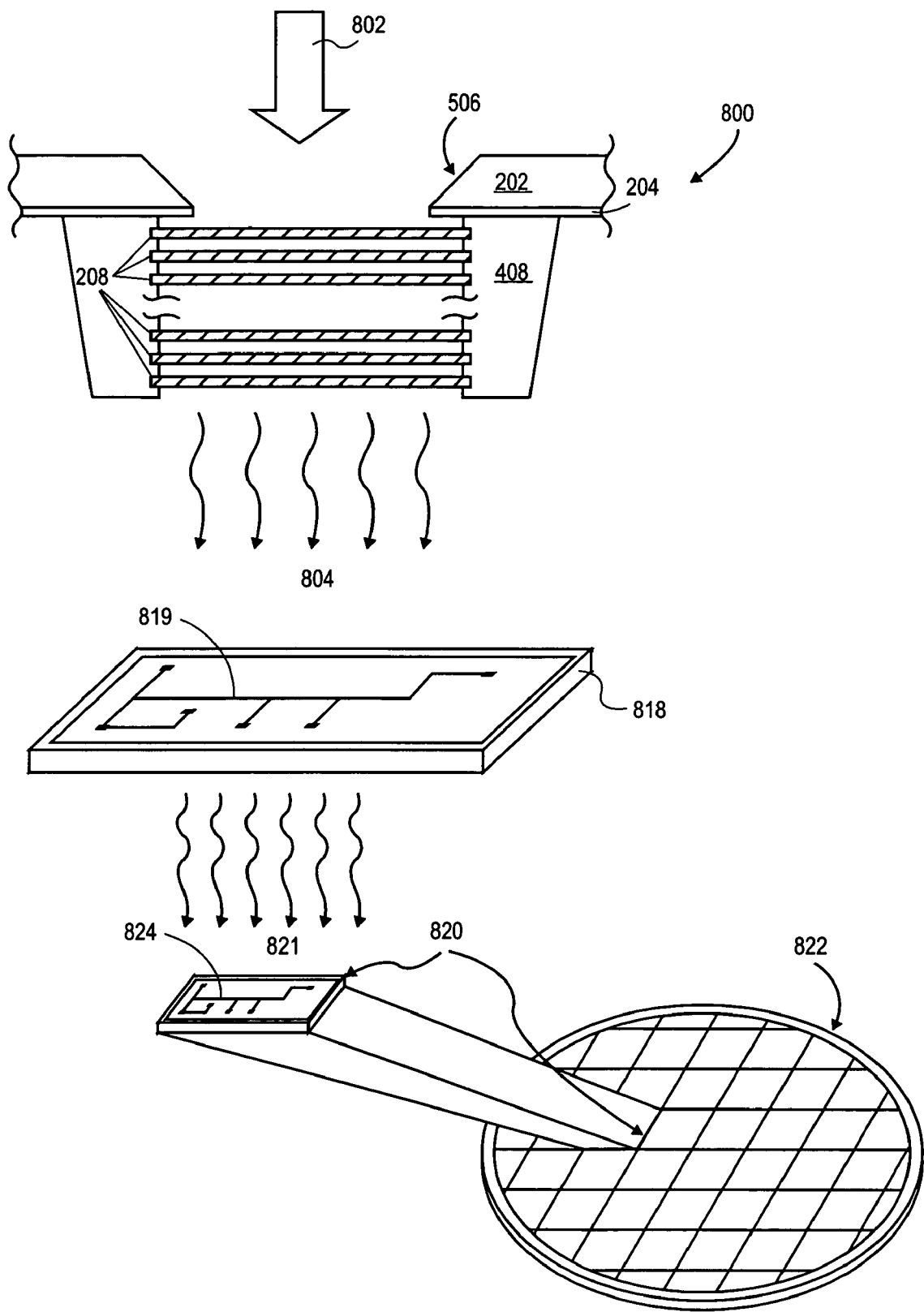

FIG. 3 further illustrates the TRE structure shown in FIG. 2 after forming trenches in the membrane stack and recessing portions of the intervening material relative to the membranes;

FIG. 4 further illustrates the TRE structure shown in FIG. 3 after filling the trenches to define support posts and patterning to remove non-functional portions of the TRE device;

FIG. 5 further illustrates the TRE structure shown in FIG. 4 after patterning the substrate to define a relativistic particle beam port opening;

FIG. 6 further illustrates the TRE structure shown in FIG. 5 after partially removing intervening material from between the membrane layers;

FIG. 7 further illustrates the TRE structure shown in FIG. 6 after substantially removing intervening material from between the membrane layers; and FIG. 8 illustrates use of a TRE structure, similar to that shown in FIG. 7, to fabricate a semiconductor structure.

DETAILED DESCRIPTION

Embodiments of the present relate generally to transition radiation emitting (TRE) structures. More specifically, embodiments of the present invention teach improved TRE structures and methods for forming them. In one embodiment, structural integrity of TRE membranes is improved by increasing the surface area of the interface between a membrane and its adjoining membrane support post. In an alternative embodiment, problems with membrane damage and stiction are avoided by removing material between membranes using a specific processing sequence.

Shown in FIG. 2 is a partially formed TRE structure that includes an etch stop layer 204 formed over a silicon substrate 202. Overlying etch stop layer 204 is a stack of membrane layers 208 and intervening material layers 206. Overlying the uppermost membrane layer 208 is a hardmask layer 210 and a patterned resist layer 212.

The TRE structure to this point has been fabricated using conventional MEMS (or alternatively, semiconductor wafer) processing. Etch stop layer 204 has been deposited over the surface of substrate 202. In one embodiment, substrate 202 is a semiconductor wafer comprising <100> silicon. Alternatively, substrate 202 can be any type of substrate suitable for fabricating MEMS structures.

In one embodiment, etch stop layer 204 is a layer of stoichiometric silicon nitride ($Si_3N_4$) deposited in a low pressure chemical vapor deposition (LPCVD) furnace and having a thickness in a range of approximately 50-150 nanometers (nm). In embodiments where batch LPCVD furnace deposition processes are used, the silicon nitride layer may be deposited both on the top surface and the bottom surface of the substrate 202 to form top etch stop layer 204A and bottom etch stop layer 204B. One of ordinary skill recognizes, however, that other processes which deposit material on only one surface of the substrate (i.e. that only deposit top etch stop layer 204A) can alternatively be used.

In addition, other materials besides silicon nitride can be used to form the etch stop layer 204. Considerations in selecting the etch stop layer 204 material include stress (in one embodiment, stress is less than approximately ±100 mega Pascal (MPa)) and the ability to protect semiconductor substrate 202 during support post trench processing (discussed with respect to FIG. 3).

Alignment marks (not shown) may also optionally be formed in the etch stop layer 204 at this point in the process. These alignment marks may be useful for subsequent alignment and etching of an e-beam port opening in the substrate 202 (discussed with respect to FIG. 5). It may also be advantageous to form a conductive material (not shown), such as a copper layer, either over the etch stop layer 204A or as a replacement alternative for etch stop layer 204A. This conductive layer may later be used as a seed layer portion that facilitates electroplating to fill the support post structure trench openings (discussed with respect to FIG. 3).

Overlying the etch stop layer 204A is a stack of alternating membrane layers 208 and intervening material layers 206. Typically a TRE structure will have greater than 15 membrane layers 208 and more typically the TRE structure will have in a range of 20-50 membrane layers 208. Throughout this specification, for the purpose of ease of illustration, fewer than 20-50 membrane layers is shown. This, however, is not intended to be a limitation of embodiments of the present invention.

As shown in FIG. 2, the first intervening material layer 206A is deposited over etch stop layer 204A. In one embodiment, the intervening material layer 206A is a 3-7 micron (um) thick layer of conventionally deposited resist. In an alternative embodiment, the intervening layer 206A is a layer of spin-on-glass (SOG). The intervening layer can ultimately be any material that functions as a sacrificial layer between the membrane layers (i.e. can be removed selectively with respect to the membrane layers). In one embodiment, the stress of the intervening material layer is in a range of ±100 MPa.

First membrane layer 208A is then formed overlying intervening membrane layer 206A. In one embodiment, the membrane layer 208A is a composite film that includes a 25-100 nm thick layer of molybdenum (Mo) capped between a lower titanium nitride (TiN) film and an upper TiN film, each TiN film having a thickness in a range of approximately 1-4 nm. In one specific embodiment (i.e. an embodiment where the targeted output is radiation at EUV wavelengths), the total thickness of the membrane layer can range from approximately 27-108 nm. One of ordinary skill in the art appreciates that the membrane layer thickness can vary depending on the targeted output wavelength.

The TiN layers provide oxidation protection for the Mo layer. Therefore, one consideration with respect to the upper and lower TiN films is that their thickness be sufficient to minimize/prevent oxidation of the Mo surface. In addition, Mo oxidation can further be reduced by depositing the TiN—Mo—TiN stack serially in a multiple chamber processing tool. This type of processing sequence reduces exposure of the Mo layer to oxidizing atmospheres.

While TiN has been disclosed, one of ordinary skill recognizes that other capping layer materials may alternatively be used. Considerations in selecting a capping layer material (in addition to its ability to reduce membrane oxidation) include the material's film stress, its EUV absorption, and its EUV radiating power. Examples of other materials suitable for use as a capping layer can include but are not necessarily limited to silicon carbide (SiC), carbon, (C), titanium nitride (TiN), tungsten (W), titanium tungsten (TiW), silicon-rich silicon nitride (SiN), stoichiometric silicon nitride (Si3N4), and the like.

The process of depositing intervening material layers 206 and membrane layers 208 is repeated until the targeted number of membrane layers 208 and intervening material layers 206 has been deposited. One of ordinary skill recognizes that the number of membrane layers incorporated into the TRE structure can depend on a variety of factors that include targeted output wavelength and TRE structure yield. These factors balance considerations such as the absorption of collective radiation by the membrane layers, the added transition radiation due to the addition of new membrane layers, the manufacturability of the TRE structure, and the overall mechanical structural integrity of the membranes.

Hardmask 210 is formed over the uppermost membrane layer (or intervening material layer 208 depending on the case). Hardmask 210 will protect portions of the stack of membrane layers 208 and intervening material layers 206 during subsequent support post trench etch processing. Considerations as to the thickness of the hardmask 210 may include: (1) the process used to form the trench, (2) the number and thickness of membrane layers 208 and intervening material layers 206 that need to be removed to form the trench, and (3) the selectively of the hardmask 210 to membranes layer 208 and intervening material layers 206.

In one embodiment, the hardmask 210 can be a polyimide layer deposited using a conventional spin-on process. In an alternative embodiment the hardmask 210 can be a layer of silicon oxynitride (SiON) deposited using conventional chemical vapor deposition (CVD) processes. In yet another embodiment, the hardmask layer can be a layer of SOG deposited using conventional processing. One of ordinary skill in the art recognizes that any number of other materials can be used to form the hardmask layer 210.

The hardmask 210 is then coated with conventional photoresist 212 and then the resist is patterned to form openings 214 that expose portions of the hardmask layer 210. Openings are then etched through the hardmask layer (not shown) to expose portions of one or more of underlying membrane layers 208 or intervening material layers 206.

Portions of the stack of membrane layers 208 and intervening material layers 206 exposed by the opening through the hardmask layer are then removed to form trenches 302 as shown in FIG. 3. Depending on the process used to form the trench (i.e., in cases where selectivity of hardmask 210 is not critical or where resist contamination is a concern) the resist may be removed prior to forming the trench opening 302. If the resist 212 is removed, the hardmask's openings can define the trench's dimensions.

The trench opening 302 can be formed using a variety of processes. In one embodiment, the trench opening 302 is formed a using a reactive ion etch (RIE) process. One of ordinary skill recognizes that openings formed using RIE (dry etch) processes can have sidewalls that are tapered. A taper may be preferred as it may enhance subsequent sidewall sputter deposition of a seed layer and facilitate an overall more uniform deposition of fill material in the trench openings 302. As shown in FIG. 3, the taper is indicated by the dimension X1 toward the top of the trench opening 302 which is larger than the dimension X2 at the bottom of the opening 302 (Note—In FIG. 3, The X1 and X2 dimensions additionally reflect subsequent processing to recess the intervening material layer 206 relative to the membrane layer 208). Alternative processes that may be used to form the trench opening include laser ablation and focused ion beam (FIB) milling. One of ordinary skill in the art recognizes that in embodiments such as these, where the laser or FIB energy can be focused on specific areas to form the opening, it may not be necessary to use the hardmask 210 or resist layer 212.

In accordance with one embodiment of the present invention, after forming the opening 302 by removing portions of membrane layers 208 and intervening material layers 206 down to the hardmask layer 204A, sidewall portions of the intervening material layers 206 are then preferentially recessed relative to the membrane layers 208, as indicated by the recess 304 of the intervening layer 309 relative to exposed membrane portion 308. Depending on its composition, the hardmask 210 may also be recessed relative to the edge of membrane layers 308 (as shown in FIG. 3. Wet chemical, isotropic dry etching, or combinations thereof may be used to form the recess 304. In embodiments where the intervening layer is resist, the etch recess can be formed by exposing the structure 300 to a solvent solution, such as acetone or any other chemistry capable of removing resist selective to membrane layers 208. In addition, prior to exposing the resist to the solvent solution, it may be advantageous to first hard bake the resist. This can slow the resist removal rate, thereby providing additional control over the amount of recess formed.

In embodiments where the intervening layer is a SOG or SiON, the recess may be produced by exposing the structure 300 to a dilute hydrofluoric acid solution or another acid solution that will isotropically etch the intervening material layers 206 selective to the membrane layers 208. Wet chemical processes may by applied using a bath (i.e. dipping the structure for a time sufficient to form the recess 304) or using a spray, for example, a spray acid or solvent tool as known to one of ordinary skill.

Recessing the intervening material layers 206 relative to the membrane layers 208 has a number of advantages that include increasing the membrane film surface area contact area with a subsequently formed support post. This improves the physical strength of the joint between the membrane layer 206 and support post. These and other advantages will be discussed subsequently with respect to FIG. 4.

At this point in the process, the hardmask 210 may optionally be removed (not shown). This can be accomplished by using the appropriate processes depending on the hardmask 210 composition and the selectivity removal requirements with respect to the membrane layers 208 and intervening material layers 206.

Next, a conductive layer 306 is deposited overlying the exposed upper surface 310 and within the trench opening 302. The conductive layer 306 can function as a seed layer for subsequent filling of the trench post opening 302. Materials used to form the conductive layer 306 can include copper (Cu), aluminum (Al), titanium (Ti), tungsten (W), and the like. To the extent that the conductive layer is used as a seed layer for subsequent deposition of material to fill the trench post opening 302, any suitable seed layer material may suffice depending on the fill material used.

In one embodiment, the conductive layer 306 is deposited to form a thickness of approximately 50-100 nm of conductive layer 306 material along the sidewalls of the trench opening 302. The conductive layer 306 may be deposited using conventional sputter, evaporation, or chemical vapor deposition techniques. Depending upon the degree of recess 304, CVD and plasma CVD may provide improved coverage of the conductive layer 306 on the undersides 312 of exposed membrane portions.

One of ordinary skill should consider the temperature constraints of the intervening layer 206 when making the choice of deposition methods for the conductive layer 306. CVD processes can have increased step coverage but typically operate at higher temperatures as compared to physical vapor deposition (PVD) processes (i.e., sputter and evaporation processes). Exposure to high temperatures can negatively impact intervening material layers formed using materials such as resist, for example. PVD processes, on the other hand, operate at lower temperatures but can have a lower degree of step-coverage as compared to CVD processes. Therefore, a balance of considerations should be made when deciding which deposition process to use.

Referring now to FIG. 4, a fill material 402 has been deposited into the openings 302, excess fill material has been removed to substantially form a support post structure 408, a hardmask 404 has been deposited and patterned with resist 406, and a partially defined TRE structure has been formed by removing non-functional membrane layer 208 and intervening material layer 206 portions.

Fill material 402 can be deposited using processes that include PVD, CVD, electroplating, and combinations thereof. In one embodiment, the fill material 402 is electroplated copper deposited using conventional methods. The thickness of the electroplated copper substantially fills the opening 302. Excess copper, i.e., copper lying outside the opening 302, is then removed. This can be accomplished using a conventional polishing (or etchback) process. In embodiments where the hardmask 210 remains over the uppermost membrane layer 206 (i.e., it has not yet been removed), polishing can be performed to remove the copper outside the opening 302, after which the hardmask can function as a polish stop layer. In embodiments where the hardmask 210 has been removed (not shown), polishing can be performed to remove the copper outside the opening 302, one or more of the uppermost membrane layers 208 and then stop on or within one of the intervening material layers 206 (or alternatively, on or within one of the membrane layers 208). As shown in FIG. 4, upon completion of the polishing operation, a support post 408 comprising material 402 is formed within the opening 302.

In accordance with a specific embodiment of the present invention, as a result of the processing to recess portions of intervening material layer 208 with respect membrane portions 206, portions of edge regions 508 of the membrane layers 208 are inset with respect to sidewalls 510 of adjoining support post structures 408. The inset membrane portion has a number of advantages over prior art membrane support post structures. The inset into the support post increases surface area contact between the membrane and support post structure. The increased surface area contact may reduce problems with membrane support post separation. In addition, unlike the prior art membranes, which are held together on the edges alone by a supporting frame, the membrane layer 208 of the present embodiment is now supported from below and above (i.e., the support post abuts at least an upper surface and a lower surface of the membrane layer). The support from above and below provides an improved ability to accommodate flexing, distortion, or snapping of the membrane that would otherwise produce permanent or temporary membrane shape changes or defects from exposure to thermal and physical stresses.

After depositing and removing excess fill material 402, hardmask layer 404 is deposited over the uppermost exposed surface 403. Like hardmask 210, hardmask 404 can include polyimide, SiON, SOG, and the like, and it can be deposited using similar methods. The hardmask 404 is then patterned with resist 406 to cover portions of the hardmask 404 overlying functional regions of the TRE structure 400. In one embodiment, functional regions include the post support structures 408 and membrane regions and intervening material layer regions between the post support structures 408. Regions of hardmask layer 404 exposed by the patterned resist are then removed using conventional polyimide, SiON, or SOG removal processes to thereby expose underlying portions of hardmask 210 (or alternatively membrane layer 208 or intervening material layer 206).

The non-functional regions associated with hardmask 210, membrane layers 208, and intervening material layers 206 are then removed to define a region where a partially formed monolithic TRE structure 400 remains. The removal 410 of the non-functional regions of membrane layers 208 and intervening material layers 206 may be performed using wet or dry etch processes, in which case removal of the resist 406 prior to etching is optional.

The removal of the non-functional regions of membrane layers 208 and intervening material layers 206 may alternatively be performed using laser ablation or FIB milling, in which case the resist may be removed prior to removal of the non-functional regions of membrane layers 208 and intervening material layers 206. In addition, to the extent that laser ablation or FIB is capable of selectively removing material independent of the patterned hardmask layer 404, the resist 406 and hardmask layer 404 may be altogether unnecessary.

Referring now to FIG. 5, after removing the non-functional regions of membrane layers 208 and intervening material layers 206, the hardmask layer 404 can be removed using a conventional polyimide, SiON, SOG etch processes, or the like, depending on the hardmask material. Moreover, if the hardmask 210 remains, it can optionally be removed at this time using the appropriate process (not shown). Alternatively, the hardmask 210 can be removed after subsequent processing to form the e-beam port opening (e-beam port opening is shown in FIG. 5).

Next, the backside of the substrate 202 is patterned and etched using conventional processing to form the e-beam port opening 506, as shown in FIG. 5. In one embodiment, the substrate 202 is clamped in a support brace, turned upside down, and resist 502 is deposited on the backside of the substrate 202. The resist 502 is patterned using conventional lithographic processing to expose bottom portions of the substrate that correspond to the e-beam port opening 506.

If the backside of the substrate is covered with etch stop layer 204B, portions of the etch stop layer 204B are first removed. In embodiments where the etch stop layer 204 is nitride and the substrate is silicon, the nitride layer 204B can first be removed using a conventional RIE nitride etch that stops on or within the silicon substrate. The resist can then optionally be removed and then a bulk silicon etch can be performed to define the e-beam port window.

In one embodiment, the bulk silicon etch can be performed by placing the substrate for approximately 6 hours into an etch bath comprising a solution of 30% potassium hydroxide (KOH) heated to approximately 80 degrees Celsius. Exposure to the KOH solution should continue until the bottom side of nitride layer 204A is exposed by the etch process. The KOH solution selectively etches the silicon substrate 202 and stops on/in the nitride etch stop 204A.

The KOH solution etches the silicon substrate preferentially along the <111> crystalline plane to produce a sloped sidewall (tapered window) opening, as shown in FIG. 5. The present inventors have determined that since the radiation emitted from the TRE device is a function of membrane thickness and spacing, it is possible, due to inexactitude of process or theoretical refractive index not corresponding to the number of membranes formed, that the emitted radiation will not be EUV but instead a different wavelength. To correct for this, the structure can be tilted to effectively alter the membrane thickness and spacing. Having a tapered sidewall allows the TRE structure to be tilted without the e-beam hitting the sidewalls.

In an alternative embodiment, the bulk silicon etch to form the opening 506 can be performed using an anisotropic RIE etch process. Upon completion of processing to define the e-beam port opening 506, a partially fabricated TRE structure similar to that shown in FIG. 5 has been formed.

Turning now to FIG. 6, hardmask 210 has been removed and exposed portions of etch stop layer 204A and portions of intervening material layers 206 have also been removed. The Hardmask 210 can be removed using conventional wet or dry etch processing. Exposed portions of etch stop layer 204A can also be removed using conventional wet or dry etch processing.

In accordance with an alternative embodiment of the present invention, portions of intervening material layers 206 are then removed from between membrane layers 208 using an improved combination wet-dry etch process.

Prior art methods of removing intervening material layers 206 from between membrane layers 208 spaced apart by distances of 3-7 um can be problematic when the diameter of the functional membrane regions is on the order of 1 millimeter (mm) or greater. Wet etching to completely remove the intervening material layer is problematic due to stiction. Stiction occurs when surface adhesion forces of adjacent membranes are higher than the mechanical restoring force of the membranes (i.e. adjacent membranes stick together and don't come apart). This can result from mechanical agitation of the wet etch, the clean, or the drying processes. Dry etching to completely remove the intervening material layer, on the other hand, is problematic due to slow process throughput and lack of etch selectivity between the membrane's capping layers and the intervening material layers.

The present embodiment mitigates the effects of stiction and reduces throughput limitations and selectivity concerns by using a wet etch to remove the majority of the intervening material layer between the membrane layers followed by the slower, less physical dry etch process to completely remove the remaining intervening material layer. Referring in FIG. 6, the partially fabricated TRE structure 500 of FIG. 5, has been placed in a wet chemical process to remove a majority of the intervening material layers 206, thereby leaving behind residual intervening portions 602. Unlike in the prior art methods, the intervening material layers are not completely removed. The residual intervening portions 602 therefore provide mechanical support for the membrane layers 208 during the wet etch, cleaning, and drying operations. The intervening portions 602 function to prevent problems with stiction that were previously unavoidable with prior art wet processes. Next, the TRE structure 600 shown in FIG. 6 is processed using a dry etch process that completely removes the residual intervening portions 602 and forms the TRE structure 700 shown in FIG. 7.

In a specific embodiment, where resist is used to form the intervening material layer 206, the structure can be placed in a wet chemistry to remove the bulk of the resist and then the remaining resist can be vaporized using a thermal bake process. In this embodiment, the resist can first be cured using a thermal or DUV plasma bake. The curing process outgases the resist and also hardens it. Curing the resist can provide additional process latitude during the wet etch process by slowing down the resist removal rate (i.e. slows down the wet etch process during release of the membrane). This can provide an improved ability to control the amount of residual intervening portion 602 that remains. After exposing the TRE structure to the wet chemical solvent process (wet bath or spray solvent tool) to remove the bulk of the intervening material layer, only residual intervening portions 602 will remain. Next the structure is cleaned and dried and then placed into a thermal bake process. Because polymers such as resist have a relatively low evaporation point, a thermal bake at temperatures in a range of 100-250 degrees Celsius can be used to vaporize the residual intervening portions 602. The thermal bake can function as a dry etch process to remove the remaining portions of the resist. In one specific embodiment, the final release of the membranes 208 as shown in FIG. 7 can be accomplished using a conventional thermal bake at a temperature in a range of approximately 150 degrees Celsius for approximately 30 minutes.

Turning now to FIG. 8, a TRE structure 800, similar to the TRE structure described in FIGS. 2-7 and formed using the one or more of the embodiments described herein, can be used to manufacture a semiconductor device. As shown in FIG. 8, an electron beam 802 can be projected through the TRE structure 800, and more specifically through electron beam port 506 and a plurality of membrane layers 208 to produce an output radiation 804 in the EUV wavelength region. The output radiation 804 can be used as a source of illumination for EUV lithography, wherein the EUV radiation is subsequently projected through a mask 818 containing a mask image 819 (For ease of explanation and illustration, other EUV projection components, such as the source collector system, the illuminator optical system, the projection optics, and the like have not been included in FIG. 8. However, one of ordinary skill recognizes that they exist and may be required for optimal TRE projection system operation). As shown in FIG. 8, the mask image 819 is transferred as an exposed pattern image 824 onto a semiconductor die 820 of a semiconductor substrate 822 via exposure radiation 821. The semiconductor substrate 822 can then be developed and etched to produce a semiconductor structure corresponding to the exposed pattern image 824.

While, the use of embodiments of the present invention have been described with respect to illumination for EUV lithography, one of ordinary skill recognizes that embodiments of the present invention may also be used for other TRE applications, such as EUV microscopy, EUV interferometric lithography, and EUV interferometry. Also, for the purposes of this specification, the term TRE structure includes the previously mentioned TRL and TRO structures, although the term TRE is not intended to be limited by the formation or use of such TRL or TRO structures. In addition, embodiments of the present invention are not necessarily limited to the use or formation of TRE structures for only EUV applications. That is, embodiments of the present invention are also applicable for fabricating TRE structures that produce illumination at wavelengths both above and below the EUV region.

The various implementations described above have been presented by way of example only, and not limitation. Having thus described in detail embodiments of the present invention, it is understood that embodiments of the present invention, defined by the appended claims, are not to be limited by particular details set forth in the above description, as many apparent variations thereof are possible without departing from the spirit or scope thereof.

What is claimed is:

1. A transition radiation emitting structure comprising a plurality of membrane layers, wherein a portion of edge regions of at least one membrane layer is inset with respect to a sidewall of an adjoining support post structure, and wherein the at least one membrane layer only partially penetrates the adjoining support post structure.

2. The structure of claim 1, wherein the plurality of membrane layers comprises at least fifteen membrane layers.

3. The structure of claim 2, wherein a thickness of a membrane layer in the plurality of membrane layers is within a range of approximately 27 to 108 nanometers, and a spacing between membrane layers is in a range approximately of 3-7 microns.

4. The structure of claim 1, wherein a membrane in the plurality of membrane layers comprises molybdenum.

5. The structure of claim 1, wherein the adjoining support post structure is tapered.

6. A method for forming a transition radiation emitting structure comprising:
    forming a stack of alternating membrane layers and intervening material layers;
    partially removing portions of the intervening material layer using a first process; and
    completely removing all remaining portions of the intervening material layer using a second process, wherein the first process is different from the second process.

7. The method of claim 6, wherein the first process is further characterized as a wet process and the second process is further characterized as a dry process.

8. The method of claim 7, wherein the second process is further characterized as a dry-etch process.

9. The method of claim 6, wherein the intervening material layer is further characterized as a resist layer.

10. The method of claim 6, wherein at least one membrane layer has a thickness in a range of approximately 27-108 nanometers, and at least one intervening material layer has a thickness in a range of 3-7 microns.

11. The method of claim 6, wherein at least one of the membrane layers comprise molybdenum.

* * * * *